United States Patent
Kelleher et al.

(10) Patent No.: US 9,351,513 B2
(45) Date of Patent: *May 31, 2016

(54) PROCESS FOR REDUCING OIL AND FAT CONTENT IN COOKED FOOD WITH ANIMAL MUSCLE PROTEIN IN SUSPENSION

(71) Applicant: Proteus Industries, Inc., Gloucester, MA (US)

(72) Inventors: Stephen D Kelleher, Ipswich, MA (US); William R. Fielding, Hilton Head, SC (US); Wayne S. Saunders, Gloucester, MA (US); Peter G. Williamson, Gloucester, MA (US)

(73) Assignee: Proteus Industries inc., Gloucester, MA (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/963,406

(22) Filed: Aug. 9, 2013

(65) Prior Publication Data

US 2014/0044859 A1 Feb. 13, 2014

Related U.S. Application Data

(60) Provisional application No. 61/682,277, filed on Aug. 12, 2012.

(51) Int. Cl.

| A23L 1/305 | (2006.01) |
|---|---|
| A23L 1/29 | (2006.01) |
| A23L 1/325 | (2006.01) |
| A23L 1/327 | (2006.01) |
| A23L 1/00 | (2006.01) |
| A23L 1/01 | (2006.01) |

(52) U.S. Cl.
CPC ............... *A23L 1/305* (2013.01); *A23L 1/005* (2013.01); *A23L 1/0107* (2013.01); *A23L 1/29* (2013.01); *A23L 1/327* (2013.01); *A23L 1/3257* (2013.01); *A23V 2002/00* (2013.01)

(58) Field of Classification Search
CPC ........... A23L 1/305; A23L 1/29; A23L 1/005; A23L 1/0107; A23L 1/3257; A23L 1/327; A23J 3/00; A23J 3/04; A23V 2002/00
See application file for complete search history.

(56) References Cited

U.S. PATENT DOCUMENTS

| 5,126,152 | A | * | 6/1992 | Feeney et al. ................. 426/102 |
|---|---|---|---|---|
| 5,217,736 | A | * | 6/1993 | Feeney et al. ................. 426/102 |
| 5,904,947 | A | * | 5/1999 | Jensen et al. .................. 426/560 |
| 5,928,701 | A | * | 7/1999 | Jensen et al. .................. 426/560 |
| 6,005,073 | A | | 12/1999 | Hultin et al. |
| 6,136,959 | A | | 10/2000 | Hultin et al. |
| 6,288,216 | B1 | | 9/2001 | Hultin et al. |
| 6,451,975 | B1 | | 9/2002 | Hultin et al. |
| 7,033,636 | B2 | * | 4/2006 | Kelleher ........................ 426/657 |
| 7,163,707 | B2 | | 1/2007 | Kelleher et al. |
| 2004/0058035 | A1 | * | 3/2004 | Kelleher et al. ................. 426/92 |
| 2005/0064085 | A1 | * | 3/2005 | Kelleher et al. ............... 426/641 |
| 2006/0204639 | A1 | * | 9/2006 | Kelleher et al. ............... 426/637 |
| 2006/0210680 | A1 | * | 9/2006 | Kelleher et al. ............... 426/281 |
| 2007/0042092 | A1 | * | 2/2007 | Kelleher et al. ............... 426/281 |
| 2011/0244093 | A1 | * | 10/2011 | Kelleher et al. ............... 426/281 |
| 2012/0171345 | A1 | * | 7/2012 | Kelleher et al. ............... 426/546 |
| 2012/0171352 | A1 | * | 7/2012 | Kelleher et al. ............... 426/657 |
| 2012/0276277 | A1 | * | 11/2012 | Kelleher et al. ............... 426/657 |
| 2015/0099866 | A1 | * | 4/2015 | Kelleher et al. ............... 530/418 |

FOREIGN PATENT DOCUMENTS

| WO | WO99/011656 | 3/1999 |
|---|---|---|
| WO | WO2010/136894 | 12/2010 |
| WO | 2011/101664 A1 | 8/2013 |

* cited by examiner

*Primary Examiner* — Anthony Weier
(74) *Attorney, Agent, or Firm* — Antoinette G. Giugliano; George A. Herbster; AGG Intellectual Property Law

(57) ABSTRACT

A product for cooking a food in oil and/or fat is provided. An adjusted pH protein suspension is produced in an aqueous or dry form and includes myofibrillar proteins and sarcoplasmic proteins substantially free of myofibrils and sarcomeres. The amount of oil and/or fat absorbed by the food during cooking is substantially reduced while the food retains its color and taste.

9 Claims, No Drawings

PROCESS FOR REDUCING OIL AND FAT CONTENT IN COOKED FOOD WITH ANIMAL MUSCLE PROTEIN IN SUSPENSION

CROSS REFERENCE TO RELATED APPLICATION

This application is a non-provisional application claiming priority from U.S. Provisional Patent Application Ser. No. 61/682,277 filed Aug. 12, 2012 for a Product and Process for Reducing Oil and Fat Content in Cooked Food with Animal Muscle Protein in Suspension.

BACKGROUND OF THE INVENTION

1. Field of the Invention

This invention relates to a process for controlling oil and fat content in cooked food. More particularly, this invention relates to such a process which utilizes animal muscle protein in a suspension form derived from animal muscle protein to control oil and fat content in food and to the food product utilized in the process.

2. Description of Related Art

Prior to the present invention, foods such as meat, vegetables, fish, nuts, pastry, fritters, doughnuts or the like cooked at an elevated temperature in oil and/or fat absorbed that oil and/or fat. These cooking processes are commonly referred to as "deep fat frying" or as "sautéing". When the food is only partially cooked in fat and/or oil, the cooked food is referred to as "par fried". The fried food then is subsequently fully cooked such as by baking. When cooked in this manner, the cooked food undesirably absorbs the fat or oil thereby reducing its nutritional and dietary value.

U.S. Pat. No. 7,163,707 describes the use of proteins from animal muscle tissue that are in soluble form and at pH of either 3.5 or less or between pH 10.5-12. These soluble forms of such proteins may have some limitations in reducing fat absorption if certain alkali metal concentrations, such as salt or leavening agents, are exceeded as described in Int. Pat. No. WO2011/101664. It has also been proposed to reduce fat or oil absorption by the food during cooking by coating the food with a substance such as pectin prior to contacting the food with the heated oil or fat. However, this approach is undesirable since significant oil or fat absorption by the food still occurs.

SUMMARY

Therefore it is an object of this invention to provide a form of food including fish, meat, vegetables, pastry or the like which can be cooked while minimizing the absorption of cooking oil or fat by the food during the cooking process.

Another object of this invention is to provide such a form of food which is as, or even more, nutritional than the original food.

Still another object of this invention is to provide such a form of food wherein the moisture and/or added flavors or spices in the uncooked food are retained during cooking.

Yet another object of this invention is to minimize the absorption of oil during frying in which the food is coated with a material that contains medium or high levels of salt.

DESCRIPTION OF ILLUSTRATIVE EMBODIMENTS

In accordance with this invention, uncooked food to be cooked with liquid oil and/or fat, including butter, is coated, injected and/or admixed with an "adjusted pH protein suspension" or a "dry adjusted pH protein suspension" derived from animal muscle tissue that contains a mixture of myofibrillar proteins and sarcoplasmic proteins obtained by a process disclosed in U.S. Pat. Nos. 6,005,073 and 6,288,216 and 6,136,959 and 6,451,975 incorporated herein by reference in their entireties. An "adjusted pH protein suspension" as used herein is meant to be a protein mixture of myofibrillar proteins and sarcoplasmic proteins derived from animal muscle tissue and which is obtained from an "aqueous acidic protein solution" (with a pH that is less than or equal to about 4.0) or an "aqueous alkaline protein solution" (with a pH that is greater than or equal to about 10.5) which is subsequently adjusted to a pH to between about 4.5 and about 7.5, and comminuted to create a protein suspension.

The phrase "dry adjusted pH protein suspension" means a dehydrated adjusted pH protein suspension and contains less than about 15 weight percent water, preferably between about 3 and 10 weight percent water and most preferably between about 3 and 7 weight percent water based on the total weight of the protein mixture and water. While a dry adjusted pH protein suspension containing 0% water is possible, dry powders containing about 0 to 3 weight percent water can be difficult and costly to process on a commercial scale. Solid mixtures of myofibrillar proteins and sarcoplasmic proteins containing greater than about 15 weight percent water based on total weight of the protein mixture and water are undesirable since they are microbially unsound.

By the phrase "aqueous acidic protein solution" as used herein is meant an aqueous solution of myofibrillar proteins and sarcoplasmic proteins derived from animal muscle tissue and having a pH of 4.0 or less, preferably a pH of 3.5 or less and most preferably a pH between about 2.5 and about 3.5, but not so low as to adversely affect the protein functionality. The "aqueous acidic protein solution" can be obtained directly from animal muscle tissue by the process methods described below. By the phrase, "aqueous alkaline protein solution" as used herein is meant an aqueous solution of myofibrillar proteins and sarcoplasmic proteins having a pH from about 10.5 to about 12.0. The aqueous alkaline protein solution can be obtained directly from animal muscle tissue by some of the processes described below.

By the phase "adjusted pH protein suspension" as used herein is meant as a suspension of myofibrillar proteins and sarcoplasmic proteins having a pH from about 4.5 to about pH 7.5, which have been derived from an aqueous acidic protein solution or an aqueous alkaline protein solution, and have been finely comminuted after the raising or lowering of pH. A "dry adjusted pH protein suspension" protein is obtained by drying the aqueous "adjusted pH protein suspension" such as by lyophilization, evaporation or spray drying.

In use and accordance with this invention an "adjusted pH protein suspension" or "dry adjusted pH protein suspension" of myofibrillar proteins and sarcoplasmic proteins in powder form, dehydrated form or small particulate form, is applied to the surface of the food to be cooked, by coating and /or injecting the protein suspension into the food or is mixed with the food (ground, minced or thinly sliced, such as hamburger or sausage). Food treated with the "adjusted pH protein suspension" or the "dry adjusted pH protein suspension" then can be cooked in liquid oil and/or fat at elevated temperature while minimizing absorption of oil and/or fat by the food.

The difference in weight of fat and/or oil between food treated in accordance with this invention after being cooked in oil and/or fat compared with food without the "adjusted pH protein suspension" or the "dry adjusted pH protein suspension" after being cooked in oil and/or fat could be between about 10% and about 70%, and more probably, would be between about 30% and about 70% less oils and/or fat. In addition, since the amount of absorbed fat or oil utilized during cooking is substantially reduced, the amount of oil or fat consumed during the cooking process for a given weight of food is correspondingly reduced.

An "aqueous adjusted pH protein suspension" or a "dry adjusted pH protein suspension" in accordance with this invention is made through the pathway of an "aqueous acidic protein solution" or an "aqueous alkaline protein solution". An "aqueous adjusted pH protein suspension" is obtained by one of four processes.

In two acidic processes animal muscle tissue is formed into small tissue particles which are then mixed with sufficient acid to form a solution of the tissue having a pH value of 4.0 or less, preferably 3.5 or less and most preferably between about 2.5 and about 3.5, but not so low a pH value as to adversely modify the animal tissue protein. In first of these two processes, this solution is centrifuged to form a lowest membrane lipid layer, an intermediate layer of "aqueous acidic protein solution" and a top layer of adjusted lipids (fats and oils). The intermediate layer of "aqueous acidic protein solution" then is separated from the membrane lipid layer or from both the membrane lipid layer and the adjusted lipid layer.

In a second of these two acidic processes, no centrifugation step is used since the starting animal muscle tissue contains low concentrations of undesired membrane lipids, oils and/or fats. In both processes, the protein mixture is free of myofibrils and sarcomeres. In both processes, the proteins in the "aqueous acidic protein solution" are adjusted to a pH between about 4.5 and 7.5 to make the protein solution into a suspension. The suspension is subsequently comminuted in a fashion to reduce the particle size of the protein suspension.

A "dry adjusted pH protein suspension" is recovered after the "aqueous acidic protein solutions" and adjusted to a pH value of between about 4.5 and 7.5 to make the protein solution into a suspension, comminuted to reduce particle size and then dried by evaporation, spray drying or lyophilizing that can be utilized with uncooked food. Alternatively, the "aqueous adjusted pH protein suspension" can be utilized directly with the uncooked food. It is preferred to utilize one of these two acid processes (centrifuged or not centrifuged) to obtain the "dry adjusted pH protein suspension" or the "aqueous adjusted pH protein suspension."

The other two processes are alkaline processes in which animal muscle tissue is formed into small tissue particles which are then mixed with sufficient aqueous base solution to form a solution of the tissue wherein at least 75% of the animal muscle protein is solubilized (e.g., at a pH value of about 10.5 or greater), but not so a high pH as to adversely modify the animal tissue protein (e.g., a pH value less than about 12). In one alkaline process, the solution is centrifuged to form a lowest membrane lipid layer, an intermediate aqueous alkaline protein rich layer and a top layer of adjusted lipids (fats and oils). The intermediate aqueous alkaline protein-rich layer then is separated from the membrane lipid layer or from both the membrane lipid layer and the adjusted lipid layer to form an aqueous alkaline phase. In a second process, no centrifugation step is used since the starting animal muscle proteins contain low concentrations of undesired membrane lipids, oils and/or fats. In both processes, the "aqueous alkaline protein solution" is free of myofibrils and sarcomeres. In both of these processes, the "aqueous alkaline protein solution" can be recovered at this point. Then, the pH of the aqueous alkaline phase is lowered to a value between about 4.5 and about 7.5, preferably between about 5.0 and 6.5 and most preferably between about 5.5 and 6.0 to produce an "aqueous adjusted pH protein solution" which is subsequently comminuted to form the "aqueous adjusted pH protein suspension". In both processes, the protein in the "aqueous adjusted pH alkaline protein solution" is recovered after centrifugation (when used), adjusted to a pH value of between about 4.5 and about 7.5, and comminuted and can be dehydrated by drying the "aqueous adjusted pH protein suspension", such as by evaporation, spray drying or lyophilization to form a powder product having the adjusted pH it had when it was dissolved in the "aqueous adjusted pH solution".

Either the "aqueous adjusted pH protein suspension" or the "dry adjusted pH protein suspension can be admixed with conventional food or nutritive additives such as breading or batter coatings, spice dry rubs, cracker meal, corn meal or the like or added to a coating solution such as a marinade. Either can be coated onto the food by use of an applicator or by immersion tumbling. Either can contain flavorants such as butter flavor, garlic flavor or the like.

In summary, varied products and processes incorporating this invention can be realized through the use of one of the following methods:

Method 1

A. Add water to and then reduce the pH of comminuted animal muscle tissue to form an "aqueous acidic protein solution" with a pH value that is less than about 4 and greater than about 2.5,
B. Optionally filter the aqueous acidic protein solution,
C. Increase the pH of the aqueous acidic protein solution to a value in the range of about $4.5 \leq pH \leq 7.5$ to produce a protein precipitate,
D. Without centrifuging, comminute the protein precipitate, and
E. Recover an "aqueous adjusted pH protein suspension" that contains membranes and that can be applied directly to food.

Method 2

A. Add water to and then reduce the pH of comminuted animal muscle tissue to form an "aqueous acidic protein solution" with a pH that is less than about 4 and greater than about 2.5,
B. Optionally filter the aqueous acidic protein solution,
C. Increase the pH of the aqueous acidic protein solution to a value in the range of approximately $4.5 \leq pH \leq 7.5$ to produce a protein precipitate,
D. Without centrifuging, comminute the protein precipitate,
E. Recover an "aqueous adjusted pH protein suspension," and
F. At least partially dry the aqueous adjusted pH protein suspension by spray-drying, lyophilizing or evaporating the aqueous adjusted pH protein suspension to obtain a "dry adjusted pH protein suspension" that can be applied to the food.

Method 3

A. Add water to and reduce the pH of comminuted animal muscle tissue to form an "aqueous acidic protein solution" with a pH that is less than about 4 and greater than about 2.5,
B. Optionally filter the protein solution, C. Centrifuge the protein solution to obtain a lipid-rich phase and an aqueous phase and separate the aqueous phase,
D. Increase the pH of the aqueous phase to a value in the range of about 4.5≤pH≤7.5 to produce a protein precipitate,
E. Comminute the protein precipitate, and
F. Recover an "aqueous adjusted pH protein suspension" that is free of membranes and that can be applied directly to food.

Method 4

A. Add water to and reduce the pH of comminuted animal muscle tissue to form an "aqueous acidic protein solution" with a pH that is less than about 4 and greater than about 2.5,
B. Optionally filter the protein solution,
C. Centrifuge the protein solution to obtain a lipid-rich phase and an aqueous phase and separate the aqueous phase,
D. Increase the pH of the aqueous phase to a value in the range of about 4.5≤pH≤7.5 to produce a protein precipitate,
E. Comminute the protein precipitate, and
F. Recover an "aqueous adjusted pH protein suspension" that is free of membranes, and
G. At least partially dry the aqueous adjusted pH protein suspension by spray-drying, lyophilizing or evaporating the aqueous adjusted pH protein suspension to obtain a "dry adjusted pH protein suspension" that can be applied to the food.

Method 5

A. Add water to and increase the pH of comminuted animal muscle tissue to form an "aqueous alkaline protein solution" with a pH of at least 10.5,
B. Optionally filter the protein solution,
C. Centrifuge the protein solution to obtain a lipid-rich phase and an aqueous phase and separate the aqueous phase,
D. Decrease the pH of the aqueous phase to a value in the range of approximately 4.5≤pH≤7.5 to produce a protein precipitate,
E. Comminute the protein precipitate, and
F. Recover an "aqueous adjusted pH protein suspension" that is free of membranes and that can be applied directly to food.

Method 6

A. Add water to and increase the pH of comminuted animal muscle t tissue to form an "aqueous alkaline protein solution" with a pH of at least 10.5,
B. Optionally filter the protein solution,
C. Centrifuge the protein solution to obtain a lipid-rich phase and an aqueous phase and separate the aqueous phase,
D. Decrease the pH of the aqueous phase to a value in the range of approximately 4.5≤pH≤7.5 to produce a protein precipitate,
E. Comminute the protein precipitate, and
F. Recover an "aqueous adjusted pH protein suspension" that is free of membranes, and
G. At least partially dry the aqueous adjusted pH protein suspension by spray-drying, lyophilizing or evaporating the aqueous adjusted pH protein suspension to obtain a "dry adjusted pH protein suspension" that can be applied to the food.

Method 7

A. Add water to and increase the pH of comminuted animal muscle tissue to form an "aqueous alkaline protein solution" with a pH of at least about 10.5,
B. Optionally filter the aqueous alkaline protein solution,
C. Decrease the pH of the aqueous alkaline protein solution to a value in the range of approximately 4.5≤pH≤7.5 to produce a protein precipitate,
D. Without centrifuging, comminute the protein precipitate, and
E. Recover an "aqueous adjusted pH protein suspension" that contains membranes and that can be applied directly to food.

Method 8

A. Add water to and increase the pH of comminuted animal muscle tissue and add water to form an "aqueous alkaline protein solution" with a pH of at least about 10.5,
B. Optionally filter the aqueous alkaline protein solution,
C. Decrease the pH of the aqueous alkaline protein solution to a value in the range of approximately 4.5≤pH≤7.5 to produce a protein precipitate,
D. Without centrifuging, comminute the protein precipitate,
E. Recover an "aqueous adjusted pH protein suspension," and
F. At least partially dry the aqueous adjusted pH protein suspension by spray-drying, lyophilizing or evaporating the aqueous adjusted pH protein suspension to obtain a "dry adjusted pH protein suspension" that can be applied to the food.

The protein suspensions formed by the methods of the present invention comprise primarily myofibrillar proteins that also contain significant amounts of sarcoplasmic proteins. The sarcoplasmic proteins in the protein product admixed with, injected into and/or coated on the uncooked food comprise above about 8%, preferably above about 10%, more preferably above about 15% and most preferably above about 18%, up to about 30% by weight sarcoplasmic proteins, based on the total weight of protein in the "aqueous adjusted pH protein suspension", or the "dry adjusted pH protein suspension."

The starting protein is derived from meat or fish, including shellfish muscle tissue. Representative suitable fish include deboned flounder, sole haddock, cod, sea bass, salmon, tuna, trout or the like. Representative suitable shellfish include shelled shrimp, crayfish, lobster, scallops, oysters or shrimp in the shell or like. Representative suitable meats include beef, lamb, pork, venison, veal, buffalo or the like; poultry such as chicken, mechanically deboned poultry meat, turkey, duck, a game bird or goose or the like.

In accordance with this invention an "aqueous adjusted pH protein suspension" or a "dry adjusted pH protein suspension" is applied to at least a portion of the surface of uncooked food, by injection into, by coating with an admixture of a "dry adjusted pH protein suspension with other ingredients. In a one embodiment of this invention, the uncooked food is both injected with and coated.

In one aspect of this invention, particulate food such as ground meat (e.g., hamburger), fish or a food mixture such as a pastry for doughnuts can be s mixed with the "aqueous adjusted pH protein suspension" or the "dry adjusted pH protein suspension" comprising myofibrillar proteins and sarcoplasmic proteins at a weight ratio usually comprising about 0.03% to about 18% weight of the protein mixture based on the weight of the uncooked food, preferably between about 0.5% and 10% weight based on the weight of uncooked food and most preferably comprising between about 0.5% to about 7% weight based on the weight of the uncooked food. When the "aqueous adjusted pH protein suspension" or the "dry adjusted pH protein suspension" is applied to at least one surface of the food, the amount of the protein mixture added is in the same weight ratio as set forth above when mixed with uncooked food. When utilizing less than about 0.03% weight protein of the "aqueous adjusted pH protein suspension", prevention of oil and/or fat absorption is not observed. When utilizing greater than about 15% weight protein the uncooked food can become undesirably hard.

Suitable oils and/or fats, including hydrogenated or non-hydrogenated oils which can be utilized to effect cooking of uncooked food are those conventionally used in cooking including lard, peanut oil, corn oil, vegetable oil, canola oil, olive oil, palm oil, coconut oil, sesame oil, sunflower oil, butter, mixtures thereof or the like.

The uncooked food which modified in accordance with this invention comprises meat, poultry and fish, including shell fish, vegetables, such as potato or onion, tempura; nuts, mushrooms, flour based foods such as batter compositions, pastry compositions, chicken or the like. Representative suitable fish include deboned flounder, sole, haddock, cod, sea bass, salmon, tuna, trout or the like. Representative suitable shell fish include shelled shrimp, crabmeat, crayfish, lobster, scallops, oysters, or shrimp in the shell or the like. Representative suitable meats include ham, beef, lamb, pork, venison, veal, buffalo or the like; poultry such as chicken, mechanically deboned poultry meat, turkey, duck, a game bird or goose or the like either in fillet form or in ground form such as hamburger. The meats can include the bone of the animal when the bone does not adversely affect the edibility of the meat such as spare ribs, lamb chops or pork chops. In addition, processed meat products which include animal muscle tissue such as a sausage composition, a hot dog composition, emulsified product or the like can be coated, injected or mixed with the "aqueous adjusted pH protein suspension" or the "dry adjusted pH protein suspension" or a combination of these methods. Sausage and hot dog compositions include ground meat or fish, herbs such as sage, spices, sugar, pepper, salt and fillers such as dairy products as is well known in the art. Representative vegetables include potato, carrot, cauliflower, onion, corn or the like. Additional foods include mushroom, nuts, batter compositions such as those comprising flour, egg and milk which can include additional food such as cornmeal, cracker meal or dusting meals.

The following example illustrates the present invention and is not intended to limit the same. Percent (%) reflects the comparative reduction of absorbed fat and/or oil in the compositions of this invention as compared to absorbed fat and/or oil by the untreated batter of the control (fat and/or oil grams of a composition of this invention of control X 100). All products were analyzed at Silliker Laboratory, Allentown, Pa. Analysis methods were: fat (AOAC 948.15); moisture (AOAC 952.09); and protein (AOAC 991.20.1).

Example 1

Extracted Pollock Proteins to Reduce or Control Fat Up-Take in Breaded Commercial Fish Portions A pollock protein solution was manufactured according to U.S. Pat. No. 6,451,975. Frozen pollock pieces were ground to fine slurry using a homogenizer (Hamilton Beach, Southern Pines, N.C.) and then acidified using phosphoric acid to a pH of 3.0 to form an aqueous acidic pollock protein solution having 2% protein by weight to the aqueous acidic pollock solution. The solution was filtered through a 1000 mesh screen to remove any undesirable solids. The filtrate was re-adjusted by varying pH for different samples; in this example, the pH values were adjusted to about 3.0, 5.0, 6.0 and 7.0 using sodium hydroxide (4M) to produce an adjusted pH solution with a pH of 3.0 and three aqueous adjusted pH protein suspensions with pH values of 5.0, 6.0 and 7.0. Each of the protein solution and adjusted protein suspensions were placed into separate containers to be used for dipping fish pieces.

Commercial raw breaded pollock shims were obtained prior to frying. The coating (all from Newly Wed Foods, Chicago, Ill.) consisted of Pre-dust (#30324), Batter (#82730) and Breadcrumb (#67353). The shims were placed into the pre-dust and shaken to remove excess dust. One dusted pollock shim was then placed into the batter mix and finally into the breadcrumbs in one of the containers. The total coating pickup target was 35% (e.g., a fish/coating would be 65/35).

More specifically, a set of five approximately 3-ounce Pollock shims were selected. A first shim was breaded conventionally without any added protein. The second shim was dipped into an aqueous pollock protein solution with a pH of about 3. The third, fourth and fifth shims were dipped into "aqueous adjusted pH protein suspensions" having pH values of about 5, 6 and 7, respectively. Each of the second through fifth portions was shaken to remove excess protein (total 6% pick-up) prior to being placed into a deep-fat fryer and par-fried for approximately 30 seconds. The cooked products were then frozen for transfer to a laboratory where each was analyzed by combining replicate portions of each sample as a composite sample. All products were analyzed at Silliker Laboratories, Allentown, Pa. The results are shown in Table 1.

TABLE 1

Chemical Analysis of Par-Fried Pollock Portions

| Sample | Fat (%) | Protein (%) | Moisture (%) |
|---|---|---|---|
| Control | 10.85 | 11.63 | 61.22 |
| Protein Solution pH 3.0 (U.S. Pat. No. 7,163,707) | 7.30 | 12.24 | 65.23 |
| Protein Suspension pH 5.0 | 6.58 | 11.38 | 65.29 |
| Protein Suspension pH 6.0 | 6.26 | 12.32 | 66.11 |
| Protein Suspension pH 7.0 | 7.46 | 11.67 | 64.99 |

A large and significant reduction in fat was observed for all the protein coated samples. There was a 32.7% reduction in fat for protein coated samples at pH=3.0 versus control; a 39.35% reduction for pH=5.0; a 42.30% reduction for pH=6.0; and a 31.24% reduction for pH=7.0.

Results also pointed to a significant increase in moisture content found in all the protein coated samples. The benefit of increased moisture content can be found in overall increased yield in production of the product.

In addition, all the products made with the protein coatings had excellent visual appearances, being quite comparable to the controls. Moreover, there were no detected flavor differences in any of the protein coated samples when compared to the control.

The invention claimed is:

1. A process for obtaining an adjusted pH protein suspension for application to a food for being cooked in an oil/fat material, said process comprising the steps of:
   A) forming an aqueous acidic protein solution having a pH in a range between 2.5 and 4.0,
   B) increasing the pH of the aqueous acidic protein solution to a pH in a range between 4.5 and 7.5 to produce a protein precipitate, and
   C) comminuting the precipitate to obtain an aqueous adjusted pH protein suspension having the comminuted precipitate wherein the aqueous adjusted pH protein suspension is used to coat or be mixed with food for being cooked in an oil/fat material to thereby reduce oil or fat content of the food when cooked, as compared to food not coated or mixed with said aqueous adjusted pH protein suspension.

2. The process of claim 1 further including, prior to step B), the step of filtering the aqueous acidic protein solution.

3. A process for obtaining an adjusted pH protein suspension for application to a food for being cooked in an oil/fat material, said process comprising the steps of:
   A) forming an aqueous acidic protein solution by decreasing the pH to a range that is between 2.5 and 4.0, or an aqueous alkaline protein solution by increasing the pH to a range between 10.5 and 12.0,
   B) adjusting the pH to a range that is between 4.5 and 7.5 of the aqueous acidic protein solution or the aqueous alkaline protein solution by increasing the pH of the aqueous acidic protein solution or decreasing the pH of the aqueous alkaline protein solution, to thereby produce a protein precipitate, and
   C) comminuting the protein precipitate to obtain an aqueous adjusted pH protein suspension having the comminuted precipitate wherein the aqueous adjusted pH protein suspension is used to coat or be mixed with food for being cooked in an oil/fat material to thereby reduce oil or fat content of the food when cooked, as compared to food not coated or mixed with said aqueous adjusted pH protein suspension.

4. The process of claim 3, further comprising centrifuging the alkaline protein solution or the acidic protein solution to obtain an aqueous phase.

5. A process for obtaining an adjusted pH protein suspension for application to a food for being cooked in an oil/fat material, said process comprising the steps of:
   A) solubilizing protein in an aqueous solution by increasing the pH to a range between 10.5 and 12.0, or decreasing the pH to a range that is between 2.5 and 4.0 to form an aqueous protein solution,
   B) precipitating the protein in the aqueous protein solution by adjusting the pH of the aqueous protein solution to a range that is between 4.5 and 7.5, and
   C) comminuting the protein precipitate to obtain an aqueous adjusted pH protein suspension having the comminuted precipitate wherein the aqueous adjusted pH protein suspension is used to coat or be mixed with food for being cooked in an oil/fat material to thereby reduce oil or fat content of the food when cooked, as compared to food not coated or mixed with said aqueous adjusted pH protein suspension.

6. The process of claim 5, further comprising centrifuging the aqueous protein solution to obtain an aqueous phase.

7. The process of claim 5, further including, prior to step B), a step of filtering the aqueous protein solution.

8. A process for obtaining an adjusted pH protein suspension for application to a food for being cooked in an oil/fat material, said process comprising the steps of:
   A) forming an aqueous acidic protein solution having a pH in a range between 2.5 and 4.0,
   B) increasing the pH of the aqueous acidic protein solution to a pH in a range between 4.5 and 7.5 to produce a protein precipitate,
   C) comminuting the precipitate to obtain an aqueous adjusted pH protein suspension having the comminuted precipitate; and
   D) drying the aqueous adjusted pH protein suspension having the protein precipitate to thereby obtain a dried protein composition;
   wherein the a dried protein composition is used to coat or be mixed with food for being cooked in an oil/fat material to thereby reduce oil or fat content of the food when cooked, as compared to food not coated or mixed with said aqueous adjusted pH protein suspension.

9. A process for obtaining an adjusted pH protein suspension for application to a food for being cooked in an oil/fat material, said process comprising the steps of:
   A) solubilizing protein in an aqueous solution by increasing the pH to a range between 10.5 and 12.0, or decreasing the pH to a range that is between 2.5 and 4.0 to form an aqueous protein solution,
   B) precipitating the protein in the aqueous protein solution by adjusting the pH of the aqueous protein solution to a range that is between 4.5 and 7.5,
   C) comminuting the precipitate to obtain an aqueous adjusted pH protein suspension having the comminuted precipitate; and
   D) drying the aqueous adjusted pH protein suspension having the protein precipitate to thereby obtain a dried protein composition;
   wherein the a dried protein composition is used to coat or be mixed with food for being cooked in an oil/fat material to thereby reduce oil or fat content of the food when cooked, as compared to food not coated or mixed with said aqueous adjusted pH protein suspension.

* * * * *